April 6, 1965   S. M. FINGERHUT ETAL   3,177,273
METHOD FOR MAKING A CERAMIC TILE FACED PANEL
Filed March 28, 1961

INVENTORS
ROBERT L. METCALF
SOLOMON FINGERHUT
REYNOLDS MARCHANT
BY
Carpenter, Abbott, Coulter & Kinney
ATTORNEYS

3,177,273
METHOD FOR MAKING A CERAMIC TILE FACED PANEL

Solomon M. Fingerhut, Los Angeles, Reynolds Marchant, Portuguese Bend, and Robert L. Metcalf, Redondo Beach, Calif., assignors to Minnesota Mining and Manufacturing Company, St. Paul, Minn., a corporation of Delaware
Filed Mar. 28, 1961, Ser. No. 98,919
4 Claims. (Cl. 264—90)

This invention relates to a method for providing ceramic tile facings on filament reinforced plastic and other supporting backings in the formation of self-sustaining structural panels and to certain novel panel structures resulting therefrom.

It is among the objects of this invention to provide a new and unique method for making ceramic tile faced, and preferably filament reinforced plastic backed, self-sustaining structural panels in a simple, expedient and economical manner which method fills the crevices between ceramic tiles of the facing with a hardenable grouting material with a completeness and reproducibility coupled with an ease and bonding firmness not readily obtainable by heretofore known bonding procedures.

It is a further object of this invention to provide a method for making ceramic tile faced self-sustaining structural panels which is equally adaptable to the application of ceramic tile facings to plane surfaced panels and to panels having curved, angled and other non-planar surfaces in a readily reproducible manner, which method eliminates hand labor, and is adaptable to a high degree of mechanization while yet requiring minimal equipment.

It is a further object of the invention to provide a new and unique means for applying a hardenable bonding material in the form of a liquid grout (which may be an ordinary water carried Portland cement, a liquid organic bonding resin or other bonding material) to fill the crevices between the tiles and the crevices between the tiles and the panel backing which means assures the prevention of air bubbles or incompletely filled joints in providing a reproducible, uniformly filled joint pattern in the finished panel.

It is a still further object of the invention to provide a method for making grout filled joints between ceramic tiles disposed in spaced relation to one another on panel forming backings which greatly reduces the possibility of joint cracking, or separation, because of incomplete bonding or differing expansion and contraction rates due to temperature extremes, or due to exposure upon weathering etc., while providing a void free joint filled uniformity in a ceramic tile faced panel not readily obtainable by means known to the prior art.

It is also an object of the invention to provide new and unique filament reinforced plastic backed and ceramic tile faced structural panels wherein the backing and the bonding resin filling the joints between the ceramic tiles of the panel form an integral unitary structure.

In the practice of this invention, the method of formation of a self-sustaining ceramic tile faced structural panel comprises placing ceramic tiles in spaced relation to one another over a unifying permanent panel backing, placing a flexible covering over the exposed tile surface of the thus formed structure and thereafter forcing the covering into tight surface engagement with and conforming the cover to the surface contours of the individual tiles by drawing a vacuum in the covered enclosure of sufficient force to cause some concave depression of the covering into the crevices between tiles to form a liquid tight seal around the edges of the tiles and to shape the finished filled joint without any necessity for striking the joint. Then a hardenable liquid grout adherent to the backing is drawn by the vacuum through the crevices between the tiles while the covering is maintained in its liquid tight sealing relation with the exposed tile surfaces. Thereafter, while still maintaining the covering in its liquid tight sealing relation the grout is hardened to solid state, interbonding the backing, tile and grout to one another. Subsequently, the vacuum may be released and the covering removed to complete the panel construction.

In a preferred procedure, the ceramic tiles, in spaced relation to one another, are laid over a previously formed filament reinforced plastic backing while maintaining the tiles in slightly spaced relation from said backing. Advantageously, the spacing of the tiles from the backing and the spacing of the tiles in edge to edge relation from one another can be readily achieved by mounting the tiles on a scrim cloth or similar carrier whereby the tiles are preassembled and held in the desired edge to edge space and simply laying the scrim cloth, or other carrier, attached tiles on the backing with the scrim cloth in contact with the backing. The scrim cloth may be of a loose, porous material such as the wide net material generally used for this purpose in the industry and maintains the tiles spaced from the filament reinforced plastic backing and from one another to the desired degree. Then a nonporous flexible cover or bag is placed over the exposed tile surface of the panel and a seal formed to hold the cover in vacuum tight relation with the panel. Then, a vacuum is drawn in the panel space between the flexible covering or bag and the reinforced plastic backing causing the covering to conform to the exposed surface contours of the tiles and to depress into the crevices between tiles sufficiently to form a liquid tight seal between the crevices and the exposed tile surfaces and fixing and maintaining the tiles in their spaced relation to one another and to the reinforced plastic backing. Then, a hardenable liquid grout adherent to the backing is introduced into one end of the vacuum chamber so formed in a continuous manner whereby the grout proceeds from one end of the panel to the other underneath the tiles and by a combination of suction and capillary action completely fills the void spaces between the tiles and the backing. By utilizing a transparent covering such as a polyvinyl alcohol, or other transparent plastic, the progress of the grout from one end of the panel to the other can be readily observed and when the grout progresses to the end of the panel where the vacuum is being pulled, the grout source can be cut off so that no more of the grout can pass into the system. Then, while maintaining the vacuum, the grout is hardened to a solid state and, since it flows both under the tiles and between the tiles by the suction in advance thereof, all voids are freed of any remaining entrapped air by the advance of the resin. Upon hardening of the grout to a solid state, joints providing an intimate interbonding of the tile, grout and backing to one another are formed in an expeditious and readily reproducible manner on both planar and non-planar tile faced surfaces, which joints are usually bubble free and appear to possess a degree of tenacity not achieved by other joint forming methods.

This preferred procedure is explained in somewhat more detail in connection with the accompanying drawings wherein.

Figure 1:
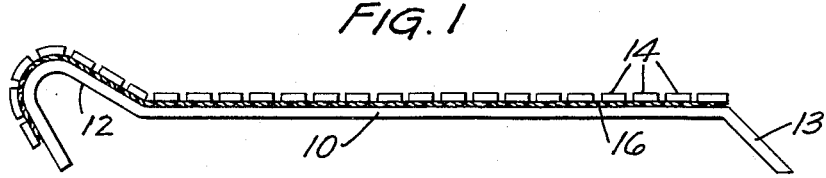
FIGURE 1 is a side elevational view of the end of a backing on which the ceramic tile facing is laid up illustrating the maintenance of the spaced relation between the ceramic tiles and between the ceramic tile facing and the backing by the scrim cloth.

Referring in more detail to FIGURE 1, there is illustrated a filament reinforced plastic panel having rather intricate surface geometry in the form of the curved flange 12 at one end thereof and an angled flange 13 at the other end thereof. Placed in overlying relation on the panel 10, including the rounded flanged end 12, is a ceramic tile facing composed of a plurality of small square, or other shaped, glazed surfaced ceramic tiles, or the like 14 attached to an underlying scrim cloth or the like 16 which maintains the tile facing in readily appliable sheet form. As is apparent the net structure of the scrim cloth 16 maintains the ceramic tiles 14 in spaced relation to the panel backing 10 while providing a continuous passageway from end to end of the panel beneath the tile. The rigidifying panel backing 10 may be initially self supporting and rigid as illustrated or it may be in a flexible condition and supported on a mold form or further rigid backing or support. A preformed filament reinforced plastic panel may comprise continuous aligned filaments or chopped filaments of glass, nylon, "Dacron" (polyethylene terephthalate filaments marketed under this trade name by Du Pont) or mixtures thereof and/or similar inert fiber reinforcement, in a resin matrix of thermoset or otherwise hardened polyester resin, epoxy resin, phenolic resin, polyurethane resin or the like. The resin matrix may also contain an inert filler material in the form of fine particles of calcium carbonate, clay, etc., in addition to various stabilizers, ultra violet light absorbers, and such other additives as may be known to the art. Such a panel may be formed on a preform mold or form, or by other known means and then hardened by ways known to the art. When a rigid preformed panel such as panel 10 is used, it is well to first roughen the surface on which the scrim cloth 16 is laid by sandblasting or the like.

Figure 2:
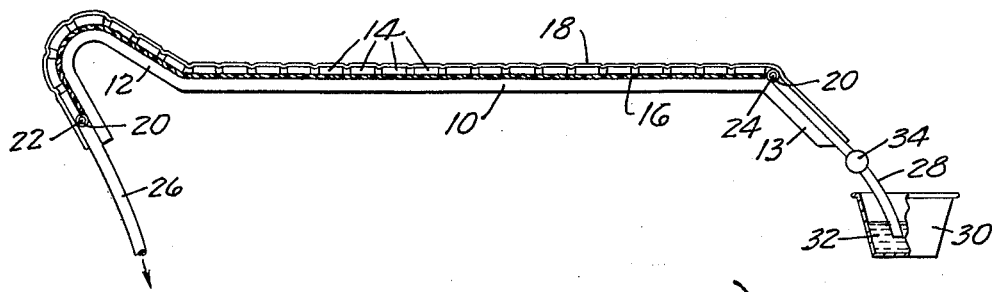
FIGURE 2 is a view similar to FIGURE 1 wherein a covering has been placed over the backing in an edge tight vacuum seal with a vacuum being drawn in the space between the cover and the backing.

After the scrim cloth carried tiles 14 are laid on the panel 10 in the manner shown in FIGURE 1, a flexible cover 18 is laid over the panel in the manner illustrated in FIGURE 2. The cover may be simply a nonporous sheet of preferably transparent or translucent plastic film such as polyethylene, polyvinyl alcohol, or the like, of sufficient thickness to avoid wrinkling but which is readily conformable to the glazed surfaces of the individual tiles 14. The cover may also be in the form of a bag which completely encases the entire panel structure. When a cover rather than a bag is used, the edges of the cover around the periphery of the panel are sealed with a sealing putty or the like to provide a vacuum tight seal.

Running underneath the cover 18 throughout its width at both ends thereof in abutment with the ends of the tile facing are skeletal tubes formed by simple spiral springs 20 (these tubes may resemble stretched screen door springs) which form continuous open longitudinal passageways 22 and 24 respectively throughout the width of the cover along each end thereof. Then, at spaced points, or even at a single point, along one end of the cover are inserted through the vacuum tight seal vacuum lines 26, each of which opens into passageway 22 at one end and connects to a suitable vacuum source (not shown) such as a vacuum pump or the like at the other end. As can be observed the springs 20 forming passageways 22 and 24 are in communication with the voids created by the tile spacing and prevent these passageways from being pinched off by the collapsing cover as the vacuum is drawn.

The passageway 24 at the end 13 of the panel 10 has extended thereinto one or more grout conducting hoses 28 or the like. This hose 28 at its other end opens into a grout reservoir 30 which holds the liquid resin or grout 32. Valve 34 in hose 28 opens and closes the hose to control the passage of grout therethrough.

Initially, until a stable vacuum is formed within the covered enclosure, the valve 34 remains closed. As the vacuum is drawn it exhausts the air from the bagged or covered enclosure and draws the surface of the cover 14 into tight conforming relation with the exposed glazed surfaces of the tiles 14 to form a liquid tight seal around each of the individual tile edges; the vacuum further depresses the bag or covering 18 into slight concavities in the crevices between tiles (note particularly FIGURE 3 for this detail). Then, after the vacuum is drawn and is stable, the liquid grout material 32 is permitted to enter the system by opening the valve 34, the vacuum drawing the grout from one end of the cover to the other underneath and between the tile 14, and assisted by capillary action, causes the grout 32 to completely fill the vacuum chamber. With a transparent or translucent bag or covering, completion of the filling is readily observable by following the progress of the grout as the joints are filled. When the grout reaches the vacuum lines 26, the resin flow is stopped by closing the valve 34. With this procedure all air pockets which might otherwise cling to the tile or backing surfaces, or form within the advancing grout are very effectively removed from the system and, so long as the vacuum is tight, a bubble free joint filled panel results wherein the grout, backing, and tiles are tenaciously interbonded.

Figure 3:
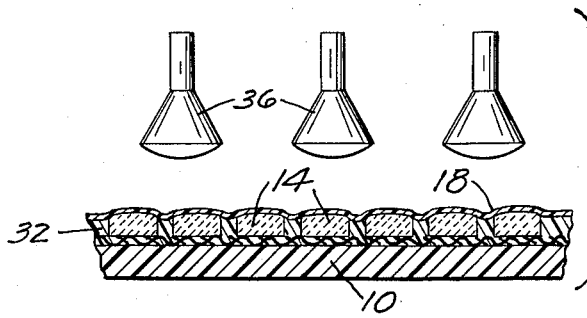
FIGURE 3 is an enlarged detailed view in cross-section of a portion of FIGURE 2 to better illustrate the relation of the covering, tiles, backing, and grout to one another during curing or hardening of the bonding resin.

As shown in the enlarged, cross-sectional detailed view of FIGURE 3, the liquid grout 32 completely fills all of the void areas between the filament reinforced backing 10 and the cover 18. Then, while still maintaining the vacuum on the system, the grout may be hardened by any suitable means; when the grout is a liquid bonding resin compatible with or identical to the resin matrix of the reinforced backing 10, cure may be effected by suitable heat curing under infrared lamps or the like 36 depicted somewhat schematically in FIGURE 3. Upon complete hardening of the resin or grout 32, or after gelation thereof to a shape retaining state, the vacuum may be released and the cover 18 removed.

Figure 4:
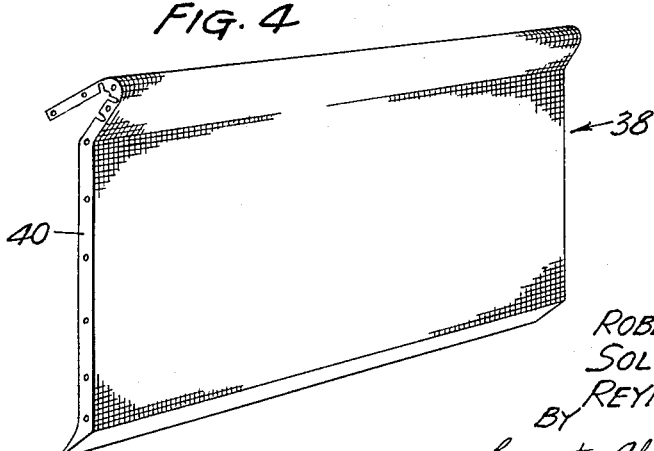
FIGURE 4 is perspective view of a complete ceramic tile faced panel made in accordance with this invention. It is understood that the drawings are illustrative only of the principles of the invention and are not drawn to scale, being schematic in some respects for clarity of detail.

In FIGURE 4 there is illustrated the completed tile faced panel 38 complete with end flanges 40 to attach it to similar panels in formation of a swimming pool lining or the like.

A detailed procedure in the construction of specific panels in accordance with this invention is presented in the example following, which example it is to be understood is illustrative and not limiting.

*Example 1*

A glass filament reinforced plastic backing panel of the shape of panel 10 of the drawing approximately $2/10''$ thick was formed on an open faced, preform mold of an approximate size 4' x 8' from a reinforced plastic backing composed of a filament reinforced resin composition containing approximately 52% powdered calcium carbonate filler, 34% thermosetting resin, 12% chopped glass filaments (about ½" to 2" in length) from 60 end roving, and approximately 2% of a curing agent for the resin.

The thermosetting resin utilized was a polyester resin of polybasic acid and propylene glycol reacted in about equal mol quantities, to which resin was added about 30% by weight styrene to keep it sufficiently fluid for molding and as a crosslinking agent on thermosetting. The catalyst utilized was methyl-ethyl ketone peroxide in a dimethyl phthalate vehicle.

This resin-filler-glass filament mixture provided a thermosetting glass filament reinforced plastic matrix which upon curing for approximately 1 hour in a 150° F. oven formed a rigid, self supporting panel. The surface of the panel on which the scrim back tile was to be laid was then roughened by sandblasting and the scrim cloth carried ceramic tile facing sheet laid thereover. The ceramic tiles of the facing were glazed surfaced squares about ⅜ of an inch on a side on a side ³⁄₁₆ of an inch thick with a convex glazed surface. The tiles were spaced from one another approximately ¹⁄₁₆ of an inch.

A 6 mil thick, transparent, nonporous polyvinyl alcohol cover was draped over the panel so formed and sealed around the edges with a sealing putty to provide a vacuum tight enclosure. In the event the reinforced plastic backing is somewhat porous, a bag may be used to bag the entire structure or a second cover may be placed over the underside and also sealed around the edges so that the entire structure will be under vacuum.

Therafter, a vacuum was drawn of about 24" of mercury through a series of vacuum lines such as 26 connected to a vacuum pump. When the vacuum was steady, valves 34 of bonding resin hoses 28 at the opposite end of the cover were opened and a liquid, thermosettable resin, compatible with the resin of the filament reinforced matrix previously mentioned, was admitted to the vacuum enclosure and, by a combination of capillary action and the suction created by the vacuum, completely filled all the voids within the vacuum chamber. The natural depression of the cover around the tile crevices forms smooth concave, uniform joint surfaces between tiles 14 which require no subsequent smoothing as by joint striking. The thermosetting liquid resin used was the same resin used in the formation of the filament reinforced plastic backing, except that only ⅕ of the amount of filler was used, to maintain the resin in a liquid free flowing state while filling the voids in the vacuum enclosure and the amount of catalyst (which was the same catalyst as that used in the matrix resin) was adjusted to give the liquid resin a sufficiently long pot life (approximately 20 minutes) to remain in a liquid state until the filling operation was completed. By suitable adjustment of the amount of catalyst, this period can be from as little as about 5 minutes to as long as about 8 hours.

Valves 34 were turned off, when upon visual inspection through the cover, it could be seen that the resin had begun to flow into the tubular passage 22 at the opposite end of the cover. While still maintaining the system under vacuum, the assembly was placed under infrared lamps shining through the transparent cover for approximately 1 hour to gel the thermosetting liquid resin. The cover was then removed and the thus formed panel was post cured in a 150° F. oven for about 1 hour. It appears that the plasticizing action of the styrene in the thermosetting bonding resin is sufficient before polymerization takes place to cause the bonding resin to fuse intimately with the already thermoset resin of the reinforced plastic backing so that the bonding resin or grout 32 and the reinforced plastic backing become integral through chemical interaction.

The resulting structure, and others made in this manner, revealed no cracking around the tile joints or separation of bonding resin from the tile or from the reinforced plastic backing under high or low temperature extremes, or weathering conditions. Attempts have been made to induce cacking or joint checking, or joint separation by subjecting these panels to rapid extremes of expansion and contraction by transferring panels from a freezing atmosphere of about minus 20° F. to boiling water without revealing any deterioration or change in the structure from its initial state.

Even more efficient chemical bonding between the reinforced plastic backing and the liquid grout material or bonding resin for the tiles is achieved when the reinforced plastic backing is maintained in an incompletely thermoset or somewhat soft state while the bonding resin is applied so that after the bonding resin 28 has been gelled to a sufficient hardness by the action of the infrared lamps 30, the resinous mass of the entire structure, when subjected to a post curing cycle in a curing oven at about 150° F. for an hour or so, reaches its final rigidity at the same time.

While to obtain an integral panel structure wherein the bonding resin 32 and the reinforced plastic backing are chemically rather than mechanically adhesively bonded to one another, the bonding resin systems 32 and that of the plastic backing must be compatible in the sense that they physically or chemically fuse or blend with one another, and preferably of the same system, this bonding procedure is in itself unique in its adaptability in the formation of any self supporting ceramic tile faced panels, regardless of the backing composition, having curved and angled surfaces as well as plane surfaces. This invention provides a new and unusual procedure for applying a grout or bonding resin, which method has great versatility, is simply carried out, and produces firm, smooth, void free joints.

The liquid grout may be a conventional cement such as a hardenable slurry of Portland cement and the like or any other type of liquid grout that may be commonly used in bonding ceramic tiles to one another, or, as described hereinbefore, is preferably an organic resin.

When the grout is an organic resin that is compatible with or identical to the resin of the filament reinforced plastic backing, a new and valuable type of ceramic tile faced structure results which apparently has sufficient elasticity to withstand violent extremes of temperatures in rapid succession without changing the character or appearance of the panel by joint cracking, checking, or other separation of joint filler from tiles and which, to all intents and purposes provides an integral structure unaffected by severe temperature extremes.

The color of the bonding resin may of course be tailored as desired by the addition of pigment to the resin and the weathering and other characteristics of the backing resin as well as the bonding resin may be improved by the addition of those additives known to the art.

Many variations of the procedure are possible. For example, the reinforced plastic backing may in turn be bonded to a further panel on the surface thereof opposite the tile facing.

Many variations from the preferred procedures are possible. A very effective variation is one where the backing is a glass filament mat, maintained as a cohesive mat by containing only sufficient binding resin at the time to hold the glass filaments in mat form, the mat resting on a backing board such as "Transite" or the like. Then, a bag is pulled over the structure and made vacuum tight. A vacuum is pulled on the system and a thermosetting or otherwise hardenable organic resin is drawn into the system to at once saturate the mat and fill the crevices between the tiles. Then, the complete structure is thermoset or otherwise hardened into a ceramic tile faced panel having a single resin system both as the grouting material for the tiles and as the matrix for the glass mat. Thereafter the vacuum can be released and the bag removed and the panel is completed. Of course, if it is not desired that the "Transite" or other backing material form a part of the completed panel structure, a mold release such as silicone oil or the like may be placed between the mat and the supporting surface therefor.

Rather than chopped filament containing backings, preformed reinforced plastic backings of aligned continuous filament panels, such as "Scotchply" (trade name of Minnesota Mining and Manufacturing Company) may be advantageously used to provide high strength, light weight structures having interbonded grout and backings.

What we claim is:

1. A method for providing a ceramic tile facing on a filament reinforced plastic backing in the formation of a self-sustaining structural panel, said method comprising placing ceramic tiles in spaced relation to one another over a previously formed filament reinforced plastic reinforcing backing, maintaining said tiles in slightly spaced relation from said backing by means of a porous, flexible element between said tiles and said backing, placing a flexible cover over the exposed tile surface of said panel in vacuum tight relation with said panel, drawing a vacuum in the panel spaced between said covering and said reinforced plastic backing causing the covering to conform to the exposed surface contours of said tiles and to depress into the crevices between tiles sufficiently to form a liquid tight seal between said crevices and the exposed tile surfaces while continuing to maintain said tiles in slightly spaced relation from said backing, introducing a hardenable liquid grout adherent to said backing into said vacuum in sufficient quantity to completely fill the voids between said covering on said backing, hardening said grout to a solid state intimately interbonding said tile and backing to one another, and thereafter releasing said vacuum and removing said covering.

2. A method for making a ceramic tile faced panel which comprises preforming a filament reinforced plastic backing containing a thermosetting binding resin cured to a shape retaining but incompletely thermoset state, placing thereover a ceramic tile facing composed of a plurality of ceramic tiles in spaced edge to edge relation and maintaining such relation by means of a scrim cloth attached to the under surfaces thereof, said scrim cloth mounted tiles being placed on said backing with the scrim cloth between the tile and the backing, placing a flexible covering over the exposed tile surface of said panel forming a vacuum between said covering and said backing of sufficient force to cause some concave depression of said covering into the crevices between tiles to form a liquid tight seal around the edges of the exposed surfaces of said tiles, and by means of said vacuum causing a thermosettable liquid resin compatible with said thermosetting backing resin to completely fill the crevices between tiles and between the tiles and the backing, thereafter thermosetting said liquid resin and said backing resin to a hard state when removing said covering.

3. A method for providing a ceramic tile facing on a structurally sustaining backing in the formation of a self-sustaining structural panel, said method comprising placing ceramic tiles in spaced relation to one another over a previously formed backing, placing a flexible covering over the exposed tile surface of the panel to be formed in vacuum tight sealing relation with the panel backing, drawing a vacuum in the panel space between the covering and the backing thereby causing the covering to conform to the exposed surface contours of said tiles and to depress into the crevices between tiles sufficiently to form a liquid tight seal between said crevices and the exposed tile surfaces, introducing a hardenable liquid grout adherent to said backing and to said tiles into the space between said covering and said backing in sufficient quantity to fill the voids between said covering and said backing to fill the tile joints, hardening said grout to a solid state intimately inter-bonding said tile and backing to one another, and thereafter releasing said vacuum and removing said covering.

4. A method of facing a rigid substantially nonporous panel with tiles which comprises placing the tiles in spaced relation to one another over the surface of said panel to be faced therewith, placing a flexible cover over the thus formed tile faced panel surface in vacuum tight relation with said panel, drawing a vacuum in the voids between said cover and said panel to conform and sealingly adhere said cover to said tile facing, and while maintaining and with the aid of said vacuum drawing a hardenable liquid grout into said voids and filling the same, then hardening said grout and releasing said cover from vacuum tight relation with said panel.

References Cited in the file of this patent
UNITED STATES PATENTS

| | | |
|---|---|---|
| 450,286 | Enricht | Apr. 14, 1891 |
| 674,125 | Semmer | May 14, 1901 |
| 2,122,696 | Poston | July 5, 1938 |
| 2,354,916 | Hurt | Aug. 1, 1944 |
| 2,388,042 | Daily | Oct. 30, 1945 |
| 2,781,554 | Robinson | Feb. 19, 1957 |
| 2,855,653 | Kastenbein | Oct. 14, 1958 |
| 2,917,801 | Fitzgerald | Dec. 22, 1959 |
| 2,972,783 | Russell et al. | Feb. 28, 1961 |
| 3,026,575 | Lusher et al. | Mar. 27, 1962 |